United States Patent [19]

Wadekamper

[11] 4,007,579
[45] Feb. 15, 1977

[54] SELECTIVE ASPARAGUS HARVESTER

[76] Inventor: Leslie Wadekamper, 17 Lowe Ahtanum Road, Yakima, Wash. 98903

[22] Filed: Nov. 28, 1975

[21] Appl. No.: 635,863

[52] U.S. Cl. .............................................. 56/327 A
[51] Int. Cl.² ....................................... A01D 45/00
[58] Field of Search ......................... 56/327 A, 229

[56] References Cited

UNITED STATES PATENTS

| | | | |
|---|---|---|---|
| 1,059,589 | 4/1913 | Bang | 56/229 |
| 3,412,541 | 11/1968 | Fuchs | 56/327 A |
| 3,495,387 | 2/1970 | Lyons et al. | 56/327 A |

*Primary Examiner*—Russell R. Kinsey
*Attorney, Agent, or Firm*—Wells, St. John & Roberts

[57] ABSTRACT

Spear cutting assemblies are described for asparagus harvesters to selectively cut mature spears having a prescribed height without cutting or damaging immature spears of a lesser height. Each assembly has a sensing means composed of two vanes that are biased together to form a "V" shaped channel to initially receive mature spears. One of the vanes engages the spear and is deflected thereby causing the rear ends of the vanes to move laterally into alignment with the spear. The movement of the vanes causes a knife subassembly to move laterally into alignment with the spear.

5 Claims, 5 Drawing Figures

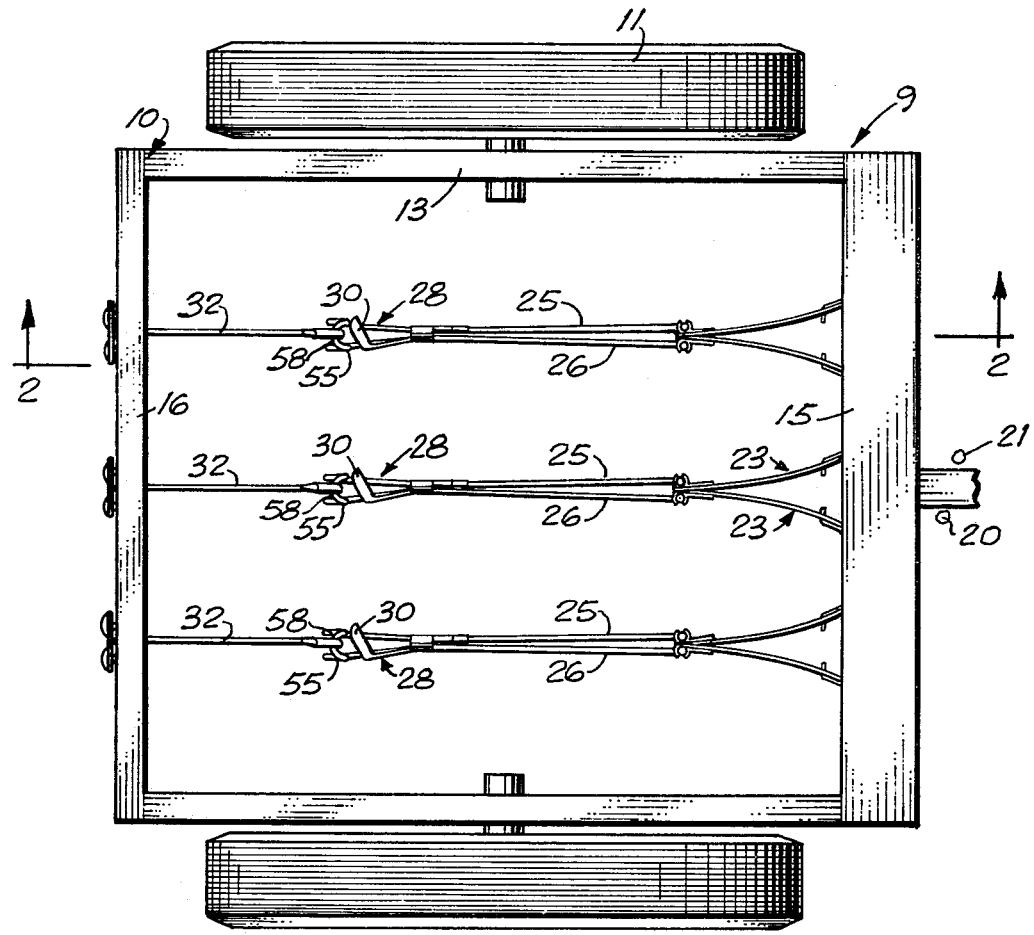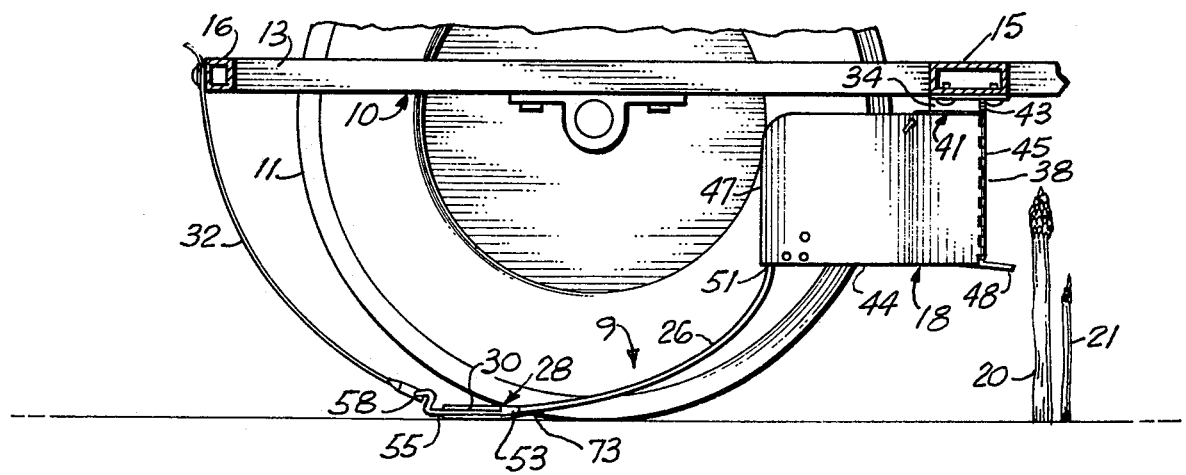

4,007,579

SELECTIVE ASPARAGUS HARVESTER

BACKGROUND OF THE INVENTION

This invention relates to asparagus harvesters and more particularly to cutting assemblies for selectively cutting mature spears without damaging immature spears.

An asparagus harvester having selective asparagus cutting assemblies is illustrated in the C. R. Lyons et al U.S. Pat. No. 3,495,387. Each cutting assembly includes sizing wires that direct mature spears to cutting blade subassembly. One of the problems associated with the use of the guide wires is a tendency of the guide wires to bend the mature spears laterally to direct the spears to the cutting blade subassembly. Such lateral bending sometimes breaks the spears. Additionally it is found that the blades encounter excessive wear.

One of the principal objects of this invention is to provide spear cutting assemblies for asparagus harvesters for selectively cutting the mature spears while leaving undamaged the immature spears in such a way as not to laterally displace the mature spears and break the spears in the process.

An additional object of this invention is to provide cutting assemblies for selectively cutting mature asparagus spears in such a manner as to eliminate excessive wear of the cutting blades.

A further object of this invention is to provide cutting assemblies that are capable of being guided laterally to a mature spear without bending the spear.

A further object of this invention is to provide a very economical and easily manufacturable spear cutting assembly for asparagus harvesters for selectively harvesting the mature asparagus spears.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which:

FIG. 1 is a plan view of a portion of a mobile asparagus harvester showing a plurality of side-by-side spear cutting assemblies;

FIG. 2 is a side elevational view of the harvester illustrated in FIG. 1;

BRIEF DESCRIPTION OF A PREFERRED EMBODIMENT

Figure 3:
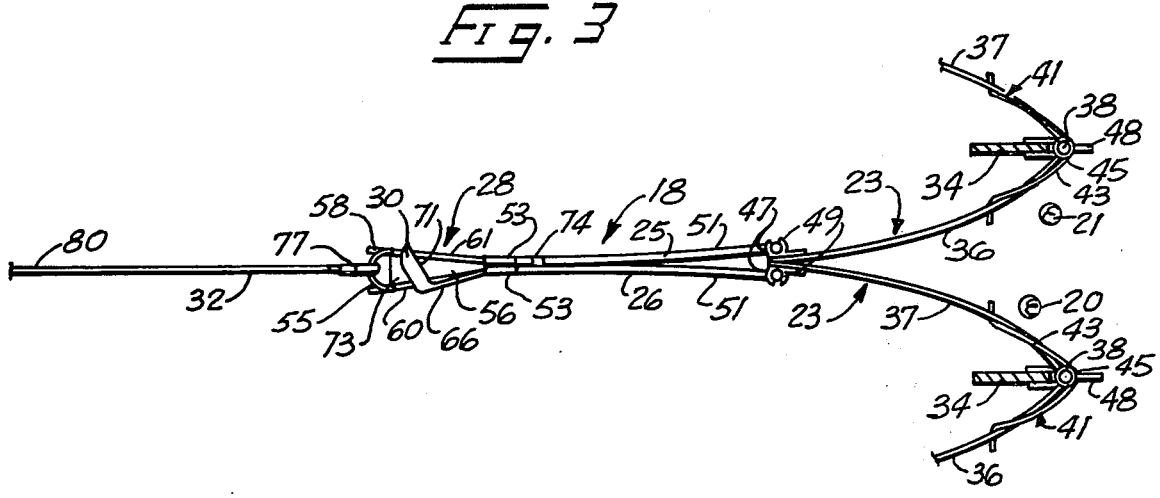
FIGS. 3–5 are fragmentary plan views of a single spear cutting assembly illustrating the steps of selecting the mature spear from an immature spear in FIGS. 3 and 4 and deflecting the cutting assembly laterally to place the cutting assembly in alignment with the selected mature spear and for presenting the mature spear to the cutting knife subassembly in FIG. 5.

In referring to the drawings there is illustrated an abbreviated mobile harvester 9 having a mobile harvester frame 10 supported by wheels 11 and 12. The frame 10 has side channels 13 and 14 and a front channel 15 and a rear channel 16. The harvester has a plurality of cutting assemblies 18 supported thereon between the front and rear channels 15 and 16 for selectively cutting mature asparagus spears 20 while leaving undamaged, immature spears 21 as the harvester is moved or propelled over the ground.

Each cutting assembly 18 includes a sensing means 23 for sensing the presence and lateral position of a mature spear 20 and for moving the cutting assembly 18 laterally into alignment with the mature spear to receive and cut the mature spear by a cutting knife subassembly 28. Sensing means 23 and the cutting knife subassembly 28 are interconnected through guide wires 25, 26 which extend from the sensing means to the cutting knife subassembly for guiding the cutting knife subassembly to the mature spear sensed by the sensing means. The cutting knife subassembly has a cutting blade 30 for severing the spear adjacent ground level. The cutting knife subassembly 28 is connected to the rear channel 16 by a stability wire 32 to prevent excessive lateral and vertical movement of the cutting knife subassembly 28. The wire 32 holds the knife subassembly 28 against the ground surface.

Each of the sensing means 23 includes a depending bracket 34 that is attached to the front frame 15 and extends downwardly. Two vanes 36 and 37 are pivotally mounted to the brackets for movement about vertical shaft 38. Each of the vanes is biased laterally toward the other vane by biasing means 41 to manually form a V shaped entrance channel. Specifically, the biasing means in the preferred embodiment includes a helical torsion spring 43 for providing a uniform bias on the vanes during the entire pivotal path of the vanes.

Each vane 36 and 37 includes a lower edge 44 that is positioned at a prescribed height identifying the minimum height of a mature spear. Each vane 36 and 37 has a forward end 45 that is pivotally connected to shaft 38. Each vane has a rear end 47 that extends outward and rearward for normal engagement with the opposing vane rear end forming the V channel. Each bracket 34 has a nose deflector 48 extending forward therefrom. The nose deflector is preferably constructed of a rubber element that is flexible to deflect a mature spear which may fall into its path to either side of the bracket.

Each cutting assembly includes interconnectors 49 that interconnect the rear ends 47 of the vane to forward ends 51 of the guide wires 25, 26. Each of the guide wires extend rearward and downward in a longitudinal direction to rear ends 53 that are attached to the cutting knife subassembly 28.

Each cutting knife subassembly 28 includes a U-shaped spring element 55 forming a spear receiving cavity 56. Each spring element 55 includes a transverse portion 58. The transverse portion 58 is located adjacent the ground level so that should a spear not be fully cut by the knife blade it will engage the transverse portion 58 and break off at the partial knife cut below the center of gravity of the spear. In the prior art devices the transverse portion is above the center of gravity of the spears so that if the spear is not fully severed by the knife blade then the spear will hit the transverse portion and bend over and break and possibly fall onto the ground. Transverse portion 58 is immediately behind and above the knife. The transverse portion 58 saddles the sometimes partially severed spear and snaps the spear at the partial cut as the spear is gripped by paddles such as shown in U.S. Pat. No. 3,641,753. With the transverse portion 58 being below the center of gravity, the spear is broken without the spear being deflected forward onto the ground.

The U-shaped spring element 55 further includes longitudinal arm elements 60 and 61 that are formed integrally with the transverse portion extending longitudinally forward to forward ends that are connected to the rear ends 53 of the guide wires 25, 26.

The blade 30 is formed with a blade arm 66 that is attached to the longitudinal arm portion 60. The blade arm 66 serves as a stiff spring to urge a curved blade portion transversely and diagonally across the spear receiving cavity 56. The curved blade portion has an end that normally extends totally across the spear receiving cavity 56. The curved portion has a forward diagonal cutting edge 71 for engaging and severing spears that are guided into the receiving cavity 56. Should the cutting edge 71 engage a rock or debris that is not severable then the curved portion will deflect out the spear receiving cavity to enable the rock or debris to pass therethrough. The blade arm 66 serves as a rather stiff spring to enable the knife edge to deflect out of the way should an obstruction be encountered. However, the blade arm normally biases the cutting edge 71 across the spear receiving cavity to sever the mature spears that are guided into the receiving cavity 56.

Figure 5:
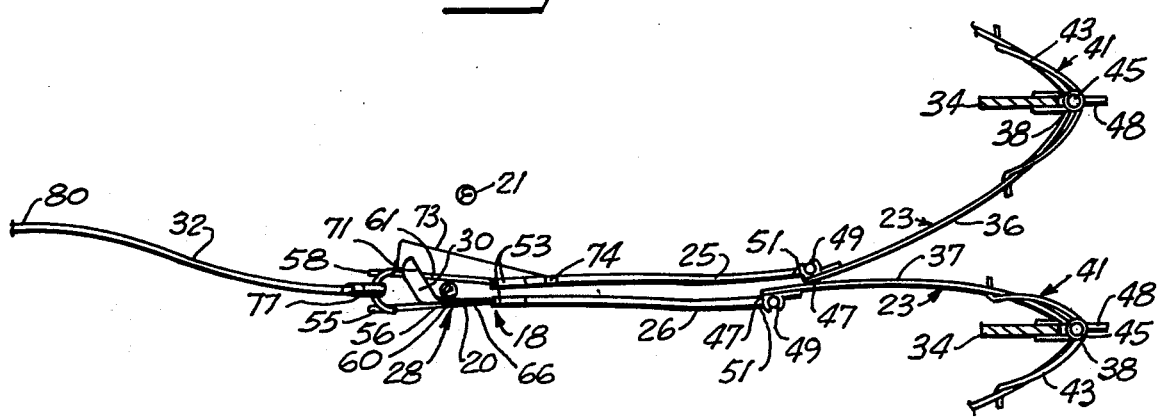

Each cutting knife subassembly 28 includes a knife guard 73 that is formed as a flat plate that rides on the ground normally beneath the blade. The knife guard 73 is affixed to guide wire 25 at 74. The knife guard 73 extends from the guide wire 25 normally rearward into the shoot receiving cavity 56 below the blade 30. As shown in FIG. 5 the guard is biased from the shoot receiving cavity 56 by a spear in the cavity 56. When the spear has passed by, the knife guard will spring back underneath the knife blade 30 to protect the knife blade. The knife guard 73 is normally in ground contact beneath the cutting edge 71. The stabilizing wire 32 has a forward end 77 that is affixed to the transverse portion 58. The wire 32 extends rearward and upward to a rear end 80 that is attached to the rear frame channel 16.

It should be understood that the cutting assemblies 18 form only one part of the harvester and there are other components that are normally included for engaging the cut spears and for conveying the spears to a storage compartment. In this regard reference is made to continuous conveyor systems that are illustrated in the Lyons U.S. Pat. Nos. 3,426,516 and 3,641,753. The description of the continuous conveyors are incorporated herein by reference as descriptive material concerning systems for picking up the severed spears after they have been cut by the cutting assembly and transferring them to a storage hopper or the like. It is not believed to be desirable to include such matter as it would only extend the length of this description.

Figure 4:
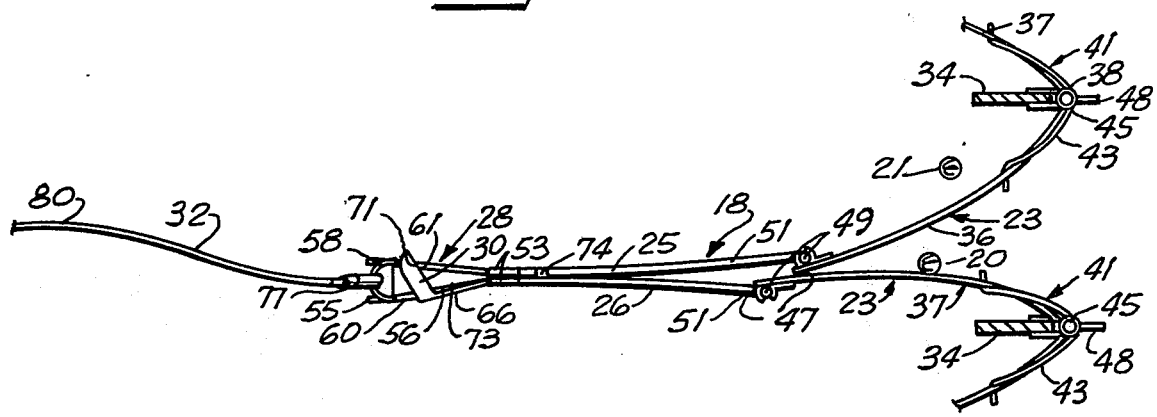

FIGS. 3–5 present a sequence view of a single cutting assembly in operation in cutting a mature spear 20 without damaging an immature spear 21. The immature spear 21 has a height below the preselected height of the lower edge 44 of the vanes 36, 37. As illustrated in FIG. 4, as the harvester moves forward the spears are presented between the vanes 36 and 37. It should be noted that the mature spear 20 and immature spears 21 are for illustrative purposes, laterally offset from the normal alignment of the cutting subassembly 28. In FIG. 4, the harvester is moved forward with the immature spear 21 passing underneath the vanes without being engaged by or damaged by the cutting knife subassembly 28. The mature spear engages vane 37 and deflects the vane laterally. The vane 36, in response to the lateral movement of the vane 37, pivots outward forming an offset V shape. When this movement occurs the ends of the vanes then draw the cutting knife subassembly 28 laterally over into alignment with the mature spear. It should be noted that the mature spear is not significantly deflected in a lateral direction that would cause the spear to break or to be damaged before it is cut.

FIG. 5 shows the spear being guided by the guide wires 25, 26 into the receiving cavity 56 for severance by the blade 30. It should be noted that as the mature spear 20 enters the spear receiving cavity 56 it deflects the knife guard 73 from the receiving cavity so that the spear is fully presented to the blade 30. The blade then will sever the spear adjacent ground level. The spear will then be conveyed by continuous conveyor or other means to a storage hopper or the like. Should the spear 20 not be completely severed it will engage the transverse portion 58 and be broken off at the partially severed point below the center of gravity of the spear so that the spear will maintain its substantial upright condition while being broken off so that it can be readily conveyed by a conveyor system.

It should be understood that the above-described embodiment is merely illustrative of the principles of this invention and numerous other embodiments may be readily devised without deviating therefrom. Of particular significance is the sensing means for sensing the presence and lateral location of mature spears and for biasing the cutting knife subassembly laterally into alignment with the mature spear so as not to cause the mature spear to be bent prior to being cut. Therefore only the following claims are intended to define this invention.

What is claimed is:

1. An asparagus harvester cutting assembly for selectively cutting mature spears having a prescribed height without cutting immature spears having a lesser height, as the harvester is propelled over the ground, comprising:

a cutting knife subassembly for riding on the soil surface having a blade adapted for cutting the mature spears at ground level;

a pair of guide wires attached to the cutting knife subassembly and extending forward therefrom to forward ends for guiding the cutting blade to the mature spears;

a sensing means operatively mounted to the harvester forward of the cutting knife subassembly at the prescribed height and connected to the front ends of the guide wires for sensing the lateral position of the mature spear and laterally moving the front ends of the guide wires and cutting knife subassembly laterally into alignment with the sensed mature spear to receive the mature spear.

2. The cutting assembly as defined in claim 1 wherein the sensing means includes two spaced vanes that extend rearward to vane ends and are biased laterally toward each other forming a V-shaped channel and wherein the guide wires have forward ends that are supported by the vane ends in which the guide wires move laterally in response to the lateral movement of the vanes.

3. The cutting assembly as defined in claim 2 wherein each vane is pivotally mounted to the harvester for pivotal movement about a vertical axis and wherein the cutting assembly further includes a helical torsion spring attached to each vane for biasing each vane about the vertical axis toward the other vane into the path of mature spears.

4. The cutting assembly as defined in claim 1 wherein the cutting knife subassembly includes a substantially U-shaped spring element having longitudinal spring arm members that extend forward alongside a spear receiving cavity in which the spring element interconnects with the guide wires and wherein the blade is mounted on one of the spring arms and normally extends transversely across the receiving cavity for severing spears presented to the spear receiving cavity.

5. The cutting assembly as defined in claim 4 further comprising a blade guard mounted to one of the guide wires and normally extending into the receiving cavity beneath the blade for sliding over the ground as the harvester is propelled to normally protect the blade and for being deflected clear of the receiving cavity and blade when a mature spear moves into the cavity.

* * * * *